US005577876A

United States Patent [19]
Haeder et al.

[11] Patent Number: 5,577,876
[45] Date of Patent: Nov. 26, 1996

[54] HYDRAULIC INTERBLOCK SYSTEM

[75] Inventors: Thomas Q. Haeder, Lisbon; Larry E. Albright, Gwinner; Orlan J. Loraas, Lisbon; William C. Shelbourn, Bismark; Gerald M. Berg; Lyle L. Johnson, both of Lisbon; Thomas M. Sagaser; Knute K. Brock, both of Bismark, all of N. Dak.

[73] Assignee: Clark Equipment Company, South Bend, Ind.

[21] Appl. No.: 199,120

[22] Filed: Feb. 22, 1994

[51] Int. Cl.$^6$ ........................................ E02F 3/00
[52] U.S. Cl. ........................ 414/699; 91/449; 180/273
[58] Field of Search ........................ 414/685, 699; 180/271, 273; 91/449, 427

[56] References Cited

U.S. PATENT DOCUMENTS

| | | | |
|---|---|---|---|
| 2,606,626 | 8/1952 | Meyer | 180/82 |
| 3,215,221 | 11/1965 | Rayman | 180/82 |
| 3,340,523 | 9/1967 | Whitman | 340/278 |
| 3,449,714 | 6/1969 | Farley, Jr. | 340/52 |
| 3,455,410 | 7/1969 | Wilson | 180/82 |
| 3,487,451 | 12/1969 | Fontaine | 303/19 |
| 3,500,946 | 3/1970 | Boyajian | 180/101 |
| 3,507,350 | 4/1970 | Boyajian | 180/101 |
| 3,740,711 | 6/1973 | Bell | 340/52 |
| 3,749,866 | 7/1973 | Tizakun et al. | 200/85 |
| 3,787,804 | 1/1974 | MacDonald | 340/52 |
| 3,788,431 | 1/1974 | York | 188/109 |
| 3,790,223 | 2/1974 | Fontaine | 303/19 |
| 3,838,748 | 10/1974 | Gray et al. | 180/101 |
| 3,864,668 | 2/1975 | Bickford | 340/52 |
| 3,892,294 | 7/1975 | Nieminski | 188/109 |
| 3,912,939 | 10/1975 | Quantz et al. | 307/10 |
| 3,927,776 | 12/1975 | Steiger | 214/140 |
| 3,960,235 | 6/1976 | Iijima | 180/82 |
| 3,986,093 | 10/1976 | Wakamatsu et al. | 318/484 |
| 4,019,602 | 4/1977 | Habiger | 180/101 |
| 4,059,196 | 11/1977 | Uchino et al. | 214/138 |
| 4,091,889 | 5/1978 | Brown et al. | 180/101 |
| 4,096,468 | 6/1978 | Kopera, Jr. | 340/52 |
| 4,103,842 | 8/1978 | Martin et al. | 242/107 |
| 4,116,296 | 9/1978 | Pleier et al. | 180/101 |
| 4,172,980 | 10/1979 | Hsieh et al. | 307/9 |
| 4,267,544 | 5/1981 | Wiblin | 338/32 |
| 4,285,418 | 8/1981 | Paine | 188/109 |
| 4,296,410 | 10/1981 | Higgs et al. | 340/686 |
| 4,313,519 | 2/1982 | Lipschutz | 180/270 |
| 4,317,500 | 3/1982 | Bening | 180/273 |
| 4,320,819 | 3/1982 | Erker | 188/109 |
| 4,344,502 | 8/1982 | Terabayashi | 180/268 |
| 4,355,698 | 10/1982 | Barnes et al. | 180/273 |
| 4,361,741 | 11/1982 | Leskoverc et al. | 200/85 |
| 4,365,429 | 12/1982 | Ecker et al. | 414/685 X |
| 4,371,741 | 2/1983 | Ando et al. | 174/15 |
| 4,385,863 | 5/1983 | Minor | 414/699 |
| 4,388,980 | 6/1983 | Vig et al. | 180/271 |
| 4,389,154 | 6/1983 | Minor et al. | 414/699 |
| 4,391,344 | 7/1983 | Weber et al. | 180/271 |
| 4,392,544 | 7/1983 | Dilno | 180/273 |
| 4,397,371 | 8/1983 | Lynnes et al. | 180/271 |
| 4,398,618 | 8/1983 | Hansen | 180/273 |

(List continued on next page.)

OTHER PUBLICATIONS

"Fluid Power in Action; Module Eqiupment" by R. T. Schneider, Aug. 1983 *Hydraulics & Pneumatics*, pp. 29–32.

*Primary Examiner*—Donald W. Underwood
*Attorney, Agent, or Firm*—Westman, Champlin & Kelly, P.A.

[57] ABSTRACT

A control apparatus controls movement of a lift arm and tool on a skid steer loader. Power actuators are coupled to the lift arm circuit and the tool circuit for moving the lift arm and tool along a path. A sensor is coupled to the skid steer loader for sensing a desired parameter and providing a signal indicative of the desired parameter. A power interrupter is coupled between the power actuators for the lift arm and tool and the sensor and interrupts power to the actuators based on the signal. A manually operable bypass mechanism is coupled to the power interrupter and the power actuators and is used to bypass the power interrupter to allow movement of the lift arm.

22 Claims, 4 Drawing Sheets

U.S. PATENT DOCUMENTS

| | | | |
|---|---|---|---|
| 4,466,504 | 8/1984 | Giandenoto et al. | 180/273 |
| 4,480,713 | 11/1984 | Macht et al. | 180/268 |
| 4,546,266 | 10/1985 | Zenick et al. | 307/10 |
| 4,550,597 | 11/1985 | Drutchas et al. | 73/118 |
| 4,579,191 | 4/1986 | Klee et al. | 180/268 |
| 4,655,313 | 4/1987 | Hicks | 180/273 |
| 4,664,218 | 5/1987 | Graham et al. | 180/273 X |
| 4,673,054 | 6/1987 | Burke et al. | 180/271 |
| 4,706,194 | 11/1987 | Webb et al. | 364/424 |
| 4,759,185 | 7/1988 | McConnell et al. | 60/444 |
| 4,796,013 | 1/1989 | Yasuda et al. | 340/562 |
| 4,844,196 | 7/1989 | Clevenger, Jr. et al. | 180/273 |
| 4,856,612 | 8/1989 | Clevenger, Jr. et al. | 180/273 |
| 4,871,044 | 10/1989 | Strosser et al. | 180/273 |
| 4,902,039 | 2/1990 | Kawai et al. | 280/802 |
| 4,909,560 | 3/1990 | Ginn | 296/65 |
| 4,951,963 | 8/1990 | Behr et al. | 280/753 |
| 4,955,452 | 9/1990 | Simonz | 180/271 |
| 5,050,700 | 9/1991 | Kim | 180/268 |
| 5,109,945 | 5/1992 | Koga | 180/273 |
| 5,129,478 | 7/1992 | Suenaga et al. | 180/263 |
| 5,203,440 | 4/1993 | Peterson, Jr. et al. | 192/0.094 |

HYDRAULIC INTERBLOCK SYSTEM

BACKGROUND OF THE INVENTION

The present invention relates to power machinery. More particularly, the present invention relates to an apparatus for controlling movement of a boom on a power machine.

Power machines, such as skid steer loaders, typically have a frame which supports a cab and a moveable lift arm which, in turn, supports a work tool such as a bucket. The moveable lift arm is pivotably coupled to the frame of the skid steer loader by power actuators which are commonly hydraulic cylinders. In addition, the tool is coupled to the lift arm by another power actuator which is also commonly a hydraulic cylinder. An operator manipulating the skid steer loader raises and lowers the lift arm, and manipulates the tool, by actuating the hydraulic cylinders coupled to the lift arm, and the hydraulic cylinder coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g. tilt the bucket) by controlling the hydraulic cylinder coupled to the lift arm and the working tool to increase or decrease in length, as desired.

It is desirable that, under certain conditions, the lift arm or the tool or both be rendered inoperable. For example, in some prior devices, when an operator leaves the cab of the skid steer loader, the hydraulic cylinders used to raise and lower the lift arm are locked out of operation. In such prior devices, an operator presence switch is coupled to the hydraulic circuit controlling the hydraulic cylinders to render the hydraulic lift cylinders inoperable when the operator presence switch indicates that the operator is not present. One example of such a system is set out in the Minor et al. U.S. Pat. No. 4,389,154.

SUMMARY OF THE INVENTION

The present invention arises from the realization that, under certain circumstances, it is advantageous to be able to manually override the lockout mechanism which renders the lift cylinders inoperable. Thus, the present invention provides a control apparatus for controlling movement of a lift arm on a skid steer loader. Power actuator means are coupled to the lift arm for moving the lift arm along a path. A sensor is coupled to the skid steer loader for sensing a desired parameter and providing a sensor signal indicative of the desired parameter. Power interruption means are coupled to the power actuator means and the sensor. The power interruption means interrupts power to the power actuator means based on the sensor signal. The present invention also provides manually operable bypass means coupled to the power interruption means and the power actuator means, for bypassing the power interruption means to allow movement of the lift arm.

DETAILED DESCRIPTION OF THE PREFERRED EMBODIMENTS

Overview

Figure 1:
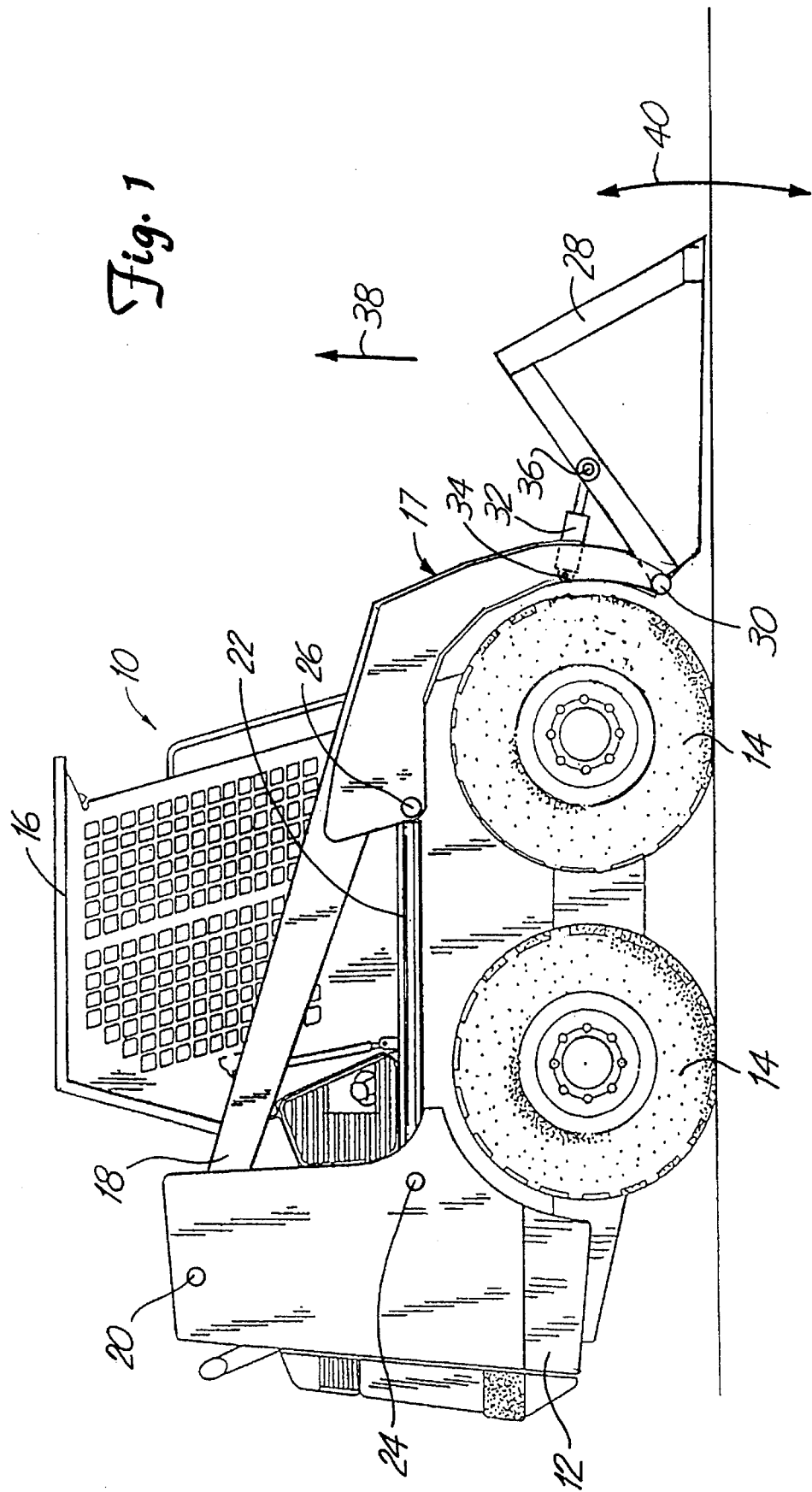
FIG. 1 is a side elevational view of a skid steer loader of the present invention.

FIG. 1 is a side elevational view of a skid steer loader 10 of the present invention. Skid steer loader 10 includes a frame 12 supported by wheels 14. Frame 12 also supports a cab 16 in which an operator resides to control skid steer loader 10. A lift arm 17 includes a pair of arms 18 which are pivotally coupled to frame 12 (only 1 of which is shown in FIG. 1, the other being identically disposed on the opposite side of loader 10) at pivot points 20. A pair of hydraulic cylinders 22 (only 1 of which is shown in FIG. 1) are pivotally coupled to frame 12 at pivot points 24 and to lift arms 18 at pivot points 26. Lift arms 18 are also coupled to a working tool which, in this preferred embodiment, is a bucket 28. Lift arms 18 are pivotally coupled to bucket 28 at pivot points 30. In addition, hydraulic cylinders 32 is pivotally coupled to lift arm 17 at pivot point 34 and to bucket 28 at pivot point 36.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, the operator can actuate cylinder 22 causing it to decrease in length moving bucket 28 generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

Normal Operation of Circuit 42

Figure 2:
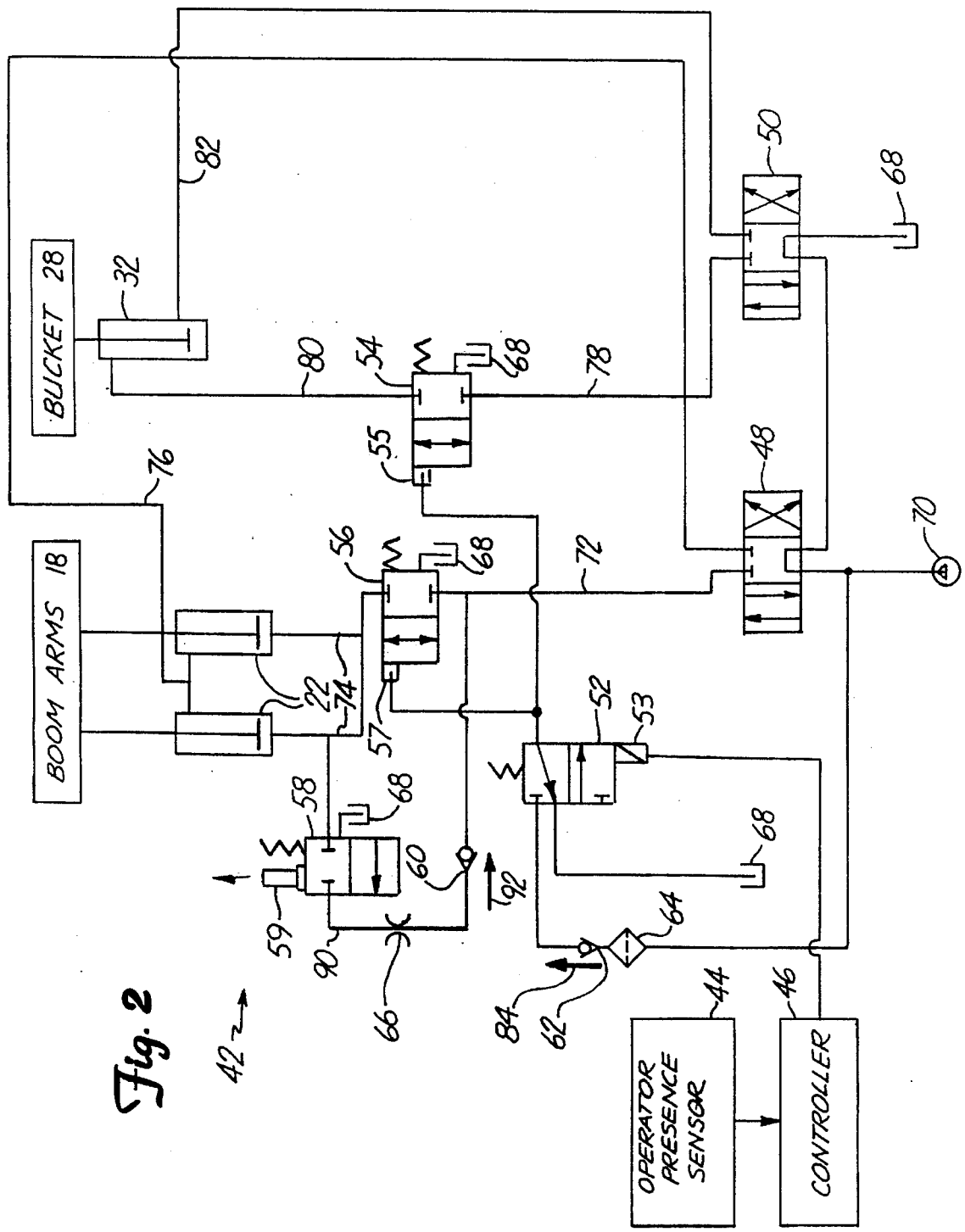
FIG. 2 is a schematic diagram of a hydraulic circuit, shown in partial block diagram form, used to implement one embodiment of the present invention.

FIG. 2 is a schematic diagram of a circuit 42 used to manipulate lift arm 17 and bucket 28. FIG. 2 is shown in partial block diagram form. Circuit 42 includes operator presence sensor 44, controller 46, lift valve 48, tilt valve 50, pilot valve 52, lockout valves 54 and 56, manual bypass valve 58, check valves 60 and 62, filter 64 and orifice 66. In addition, circuit 42 is shown having appropriate connections to tank 68 and pump 70.

In operation, pump 70 supplies fluid under pressure to lift valve 48 and tilt valve 50. In the preferred embodiment, lift valve 48 and tilt valve 50 are operator actuated valve spools which direct flow of the fluid under pressure provided by pump 70 based on the operator's desired manipulation of lift arms 18 and tool 28. When the operator desires to raise lift arms 18, the operator actuates valve 48 to direct the fluid under pressure to supply line 72, through lockout valve 56 (which, during normal operation, is open to allow passage of fluid). Lockout valve 56 in turn, supplies the fluid under pressure to supply lines 74 which are connected to cylinders 22. When the fluid under pressure is supplied by lines 74 to cylinders 22, cylinders 22 increase in length thereby raising lift arms 18. During this lifting operation, fluid is removed from cylinders 22 by line 76 which acts as a return line to valve 48.

Conversely, when the operator desires to lower lift arms 18, the operator causes valve 48 to supply fluid under pressure along line 76 to hydraulic cylinder 22. Lines 74 and line 72 then act as return lines carrying fluid from hydraulic cylinders 22 back to valve 48. This causes cylinder 22 to decrease in length and thereby lower lift arms 28.

Also, in the preferred embodiment, valve 50 is an operator actuated valve spool which directs the flow of fluid under pressure from pump 70. When the operator desires to tilt tool 28 in one direction, the operator causes valve 50 to supply the fluid under pressure from pump 70 along supply line 78, through lockout valve 54 (which is open during normal operation to allow fluid flow therethrough), through supply line 80 to cylinder 32. Line 82 then acts as a return line removing fluid from cylinder 32 and supplying it to valve 50. This causes cylinder 32 to decrease in length thereby pivoting bucket 28 in a first direction.

Conversely, when the operator desires to pivot bucket 28 in a second direction, opposite the first direction, the operator causes valve 50 to supply fluid under pressure from pump 70 along line 82 to cylinder 32. Lines 80 and 78 then act as return lines carrying fluid from cylinder 32 to valve 50. This causes cylinder 32 to increase in length thereby pivoting bucket 28 in a second direction, opposite the first direction.

Lockout and Bypass Operation

Circuit 42 is also configured to lockout certain operations of lift arms 18 and bucket 28 under certain conditions. For example, it is, at times, desirable to lockout operation of lift arms 18 and bucket 28 when the operator is not in the normal operating position in cab 16 of skid steer loader 10.

In the preferred embodiment, lockout valves 54 and 56 are normally closed valves. When pilot pressure is applied at control inputs 55 and 57, the valves open allowing fluid to pass therethrough. However, when pilot pressure is removed, valves 54 and 56 close precluding fluid from passing therethrough.

Pump 70 supplies fluid under pressure through filter 64, and checkvalve 62 to pilot valve 52. Checkvalve 62 ensures that fluid only passes in the direction indicated by arrow 84. During normal operation, controller 46 provides a signal at control input 53 of pilot valve 52 causing pilot valve 52 to supply the fluid under pressure from checkvalve 62 to control inputs 55 and 57 of lockout valves 54 and 56. This causes valves 54 and 56 to open.

However, operator presence sensor 44 which is preferably any suitable operator presence sensor, such as a seat sensor or a seat bar sensor, or a combination of both, is coupled to sense the presence of the operator in cab 16. When operator presence sensor 44 senses that the operator is not in the normal operating position in cab 16, operator presence sensor 44 provides a sensor signal to controller 46 indicative of that fact. In a preferred embodiment, controller 46 is a digital computer.

When controller 46 receives the operator presence sensor signal from sensor 44 indicating that the operator is no longer in the normal operating position, controller 46 removes a control signal to input 53 of pilot valve 52 causing pilot valve 52 to remove the fluid under pressure from inputs 55 and 57 of lockout valves 54 and 56. Rather, the control inputs 55 and 57 are allowed to drain to tank 68 through pilot valve 52. This removal of pilot pressure from control inputs 55 and 57 causes lockout valves 54 and 56 to close thus blocking the flow of hydraulic fluid along lines 72 and 78, between valves 48 and 50 and cylinders 22 and 32, respectively. This effectively locks out the lift and tilt functions used in manipulating lift arms 18 and bucket 28 in both directions of actuation.

Circuit 42 is also provided with manual bypass valve 58 used to bypass lockout valve 56. In a preferred embodiment, manual bypass valve 58 has a manually actuable input mechanism 59 used in controlling the operation of manual bypass valve 58. During normal operation, manual bypass valve 58 is biased closed. This precludes flow of hydraulic fluid through valve 58. However, when a lockout condition occurs, and lockout valves 54 and 56 close blocking the flow of fluid, it may be desirable to enable certain functions of lift arms 18. In the preferred embodiment, manual bypass valve 58 is provided to bypass lockout valve 56 to allow lift arms 18 to be lowered even during a lockout condition.

When manually operable input mechanism 59 is actuated by the operator, the manual bypass valve 58 is opened allowing fluid to pass through valve 58. The fluid passes through passage 90, through orifice 66, through checkvalve 60 in the direction indicated by arrow 92, back through line 72 to lift valve 48. When the operator both actuates input mechanism 59, and operates lift valve 48 to lower lift arms 18, the hydraulic fluid is passed through valve 48, to tank 68. Thus, even during a lockout condition, as long as the operator operates input mechanism 59, and also operates valve 48 to lower lift arm 18, lift arm 18 can be lowered which also relieves pressure in the system.

Orifice 66 is provided as a constricted flow region in line 90 to constrict flow of fluid through line 90. This ensures that the velocity at which lift arms 18 are lowered is quite low. In addition, checkvalve 60 is a one-way valve ensuring that fluid only passes in the direction indicated by arrow 92.

Lockout and Bypass Valves

Figure 3:
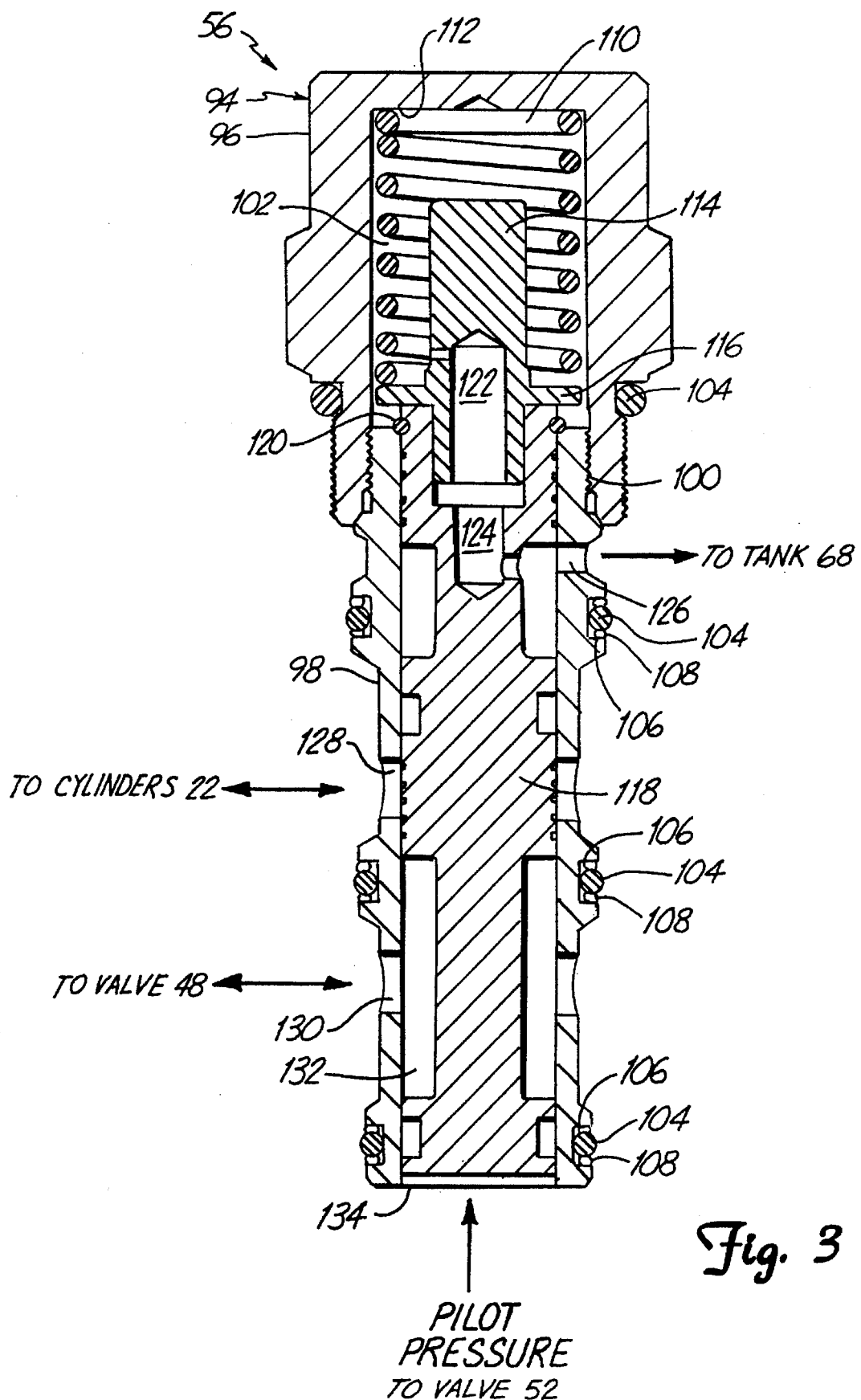
FIG. 3 is a sectional view of a lockout valve of the present invention.

FIG. 3 is a cross-sectional view of a lockout valve used as lockout valves 54 and 56. Since both valves 54 and 56 are substantially identical, for the sake of simplicity, the present description will continue only with respect to valve 56. Valve 56 includes a housing 94 which, in the preferred embodiment, is formed of cap 96 and shaft 98. Cap 96 and shaft 98 are coupled together along surfaces 100 to define a generally axial bore or spring chamber 102. Cap 96 and shaft 98 are preferably coupled by any suitable commercially available adhesive, or by press fitting, or another suitable method.

Housing 94 is fit within hydraulic lines in circuit 42 through the use of a number of O-rings 104. In the preferred embodiment, O-rings 104 are disposed about the periphery of shaft 98 and are located in notches 106. The O-rings 104 are secured in notches 106 by backup rings 108.

Bias spring 110 is loaded within spring chamber 102 and abuts, at one end, an upper interior surface 112 of cap 96. Spring guide 114 is also loaded into cap 96. Spring guide 114 has an integral annular ring 116 against which spring 112 abuts at its second end. Spool 118 is disposed within shaft 98 and abuts annular ring 116 opposite spring 110. Spool 118 is provided with an O-ring 120 which abuts shaft 98. Spring guide 114 includes a vent cavity 122 which communicates with spring chamber 102 and also with a vent cavity 124 in spool 118. Vent cavity 124, in turn, communicates with port 126 in shaft 98 which is coupled to tank 68. Thus, spring chamber 102 in spring housing 94 is vented to tank 68.

Shaft 98 also includes poets 128 and 130 which cooperate with annular notch 132 in spool 118. Ports 128 and 130 are coupled to cylinders 22 and valve 48, respectively. Further, shaft 98 includes port 134 which is coupled to receive pilot pressure from valve 52.

In operation, spring 110 is typically expanded forcing spool 118 downward to the position shown in FIG. 3. However, when pilot valve 52 supplies pilot. pressure to port 134, spool 118 moves upwardly compressing spring 110 until annular notch 132 in spool 118 connects both ports 128 and 130 thereby allowing fluid communication between ports 128 and 130. When ports 128 and 130 are coupled by annular notch 132, hydraulic fluid can flow between valve 48 and cylinders 22.

When operator presence sensor 44 detects that the operator is not in normal operating position in cab 16, controller 46 removes a signal to valve 52 that removes pilot pressure from port 134 of lockout valve 56. This allows spring 110 to expand, thereby pushing spool 118 back into the position shown in FIG. 3. When spool 118 is in that position, ports 128 and 130 are no longer in fluid communication so that valve 48 can no longer communicate with cylinders 22 through valve 56.

Figure 4:
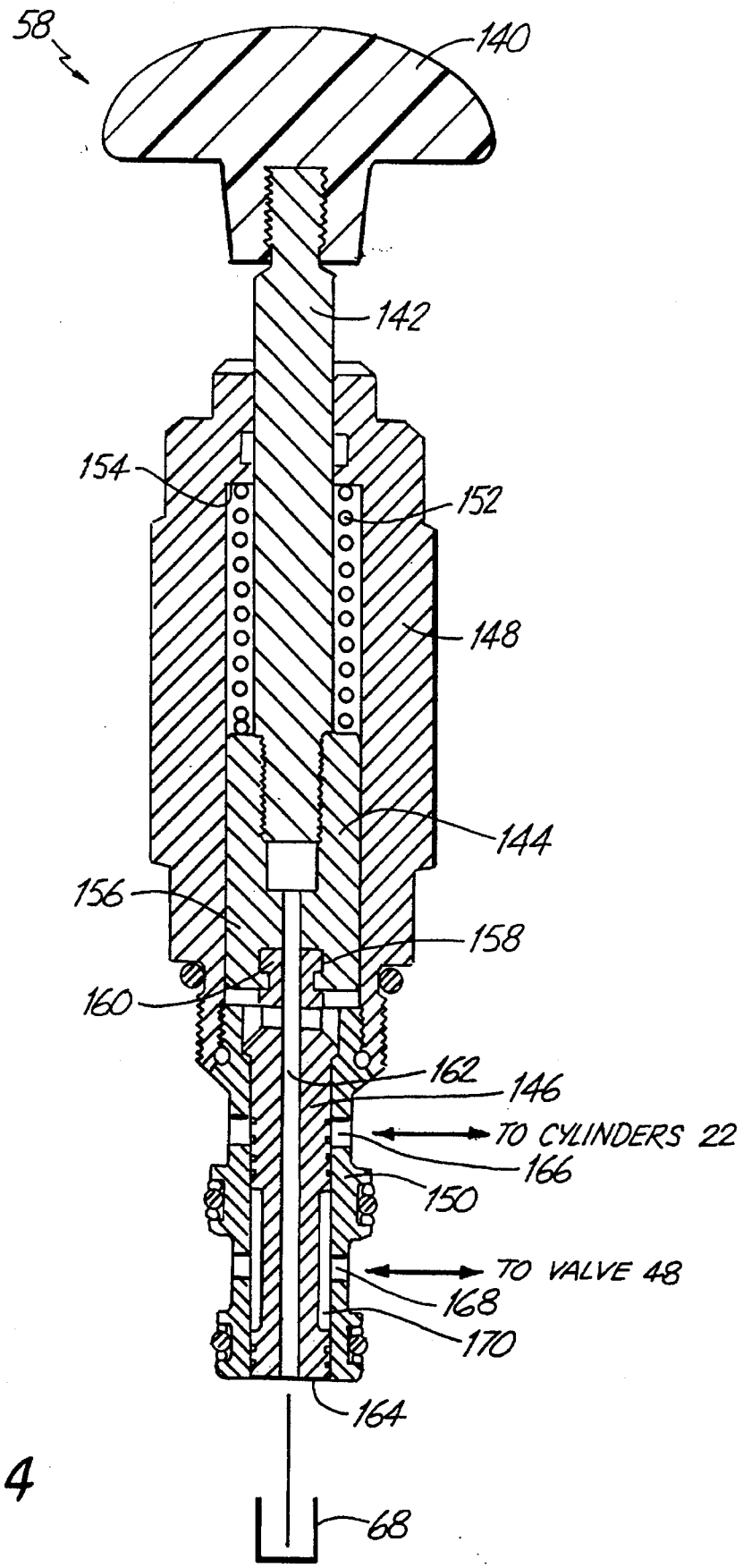
FIG. 4 is a sectional view of one embodiment of a manually operable bypass valve of the present invention.

FIG. 4 is a cross-sectional view of manual bypass valve 58. Bypass valve 58 includes handle 140, plunger 142, collar 144, spool 146, housing 148, shaft 150 and bias spring 152. At the outset, it is worth noting that shaft 150 is coupled to the hydraulic lines in circuit 42 by the same O-ring and back-up ring configuration as valve 56.

Handle 140 is rigidly coupled to plunger 142. Plunger 142, in turn, is rigidly coupled to collar 144. Housing 148 forms a spring chamber within which spring 52 is disposed. Spring 152 abuts an upper, inner surface 154 of housing 148, as well as collar 144. Collar 144 has a lower end 156 which has an annular notch 158 that communicates with annular tab 160 of spool 146. Thus, collar 144 and spool 146 are rigidly attached. Spool 146 includes an axial shaft 162 that communicates with the spring chamber defined by housing 148, through collar 154. Axial shaft 162 communicates with port 164 in shaft 146 which is, in turn, coupled to tank 68. Thus, the spring chamber defined by housing 148 is vented to tank 68.

In an arrangement similar to that shown in FIG. 3, valve 58 includes ports 166 and 168. Port 166 communicates with cylinders 22 while port 168 communicates with valve 48. In normal operation, spring 152 is in an expanded position forcing spool 146 to the position shown in FIG. 4. In such a position, ports 166 and 168 are not in fluid communication with one another. Thus, no fluid can pass between cylinders 22 and valve 48 through bypass valve 58.

However, during manual actuation of bypass valve 58, the operator pulls upwardly on handle 140, compressing spring 152 in the spring chamber defined by housing 148. This moves spindle 146 upwardly so that annular notch 170 in spool 146 connects ports 166 and 168 allowing the two ports to communicate with one another. This allows fluid to pass between cylinders 22 and valve 48 through manual bypass switch 58. Thus, even when lockout valve 56 prevents fluid flow between cylinders 22 and valve 48 through valve 56, lockout valve 56 can be manually bypassed through the actuation of bypass valve 58.

Conclusion

It should be noted that, although the present invention is described with reference to hydraulic cylinders, the cylinders could be air driven or could be any other suitable form of power actuators.

It should also be noted that circuit 42 can be implemented in a number of different configurations. For example, in one preferred embodiment, orifice 66 and checkvalve 60 are integral with one another. In addition, the valves can be configured in a number of different manifolds. For example, in the preferred embodiment, manual bypass valve 58, checkvalve 60, and lockout valve 56 are formed on a single manifold. However, any suitable configuration can be used.

Finally, it should be noted that other interlocks can also be provided on circuit 42. For example, a seat bar interlock may be coupled to valve 48 precluding operation of valve 48 unless the seat bar is in the proper position. While not shown with respect to the present invention, a preferred embodiment appropriate to any given set of circumstances may require such interlocks.

Although the present invention has been described with reference to preferred embodiments, workers skilled in the art will recognize that changes may be made in form and detail without departing from the spirit and scope of the invention.

What is claimed is:

1. In a skid steer loader of the type having a control apparatus for controlling movement of a lift arm on the skid steer loader, the improvement comprising:

power actuator means, coupled to the lift arm, for moving the lift arm along a path;

a hydraulic power circuit coupled to the power actuator means, providing hydraulic power to the power actuator means, along a first power path, to move the lift arm in a first direction;

a sensor, coupled to the skid steer loader, for sensing a desired parameter and providing a sensor signal indicative of the desired parameter;

power interruption means, including a first hydraulic valve coupled in the first power path to the power actuator means and the sensor, for interrupting power to the power actuator means based on the sensor signal; and manually operable bypass means, including a second hydraulic valve coupled to the hydraulic power circuit and the power actuator means, for providing a second power path between the hydraulic power circuit and the power actuator means, bypassing the power interruption means to allow movement of the lift arm.

2. The control apparatus of claim 1 and further comprising:

input means, coupled to the hydraulic power circuit, for providing a command input, the hydraulic power circuit providing power to the power actuator means to move the lift arm in the desired direction along the path based on the command input.

3. The control apparatus of claim 2 wherein the power interruption means causes the power actuator means to become inoperable when power is interrupted, and wherein the manually operable bypass means, when actuated, precludes the power interruption means from preventing the lift arm from being moved in a first direction along the path.

4. The control apparatus of claim 3 wherein the manually operable bypass means is coupled to the input means so that the lift arm is operable for movement in the first direction when the manually operable bypass means is actuated and when the command input indicates that the desired direction is the first direction.

5. The control apparatus of claim 4 wherein the power actuator means comprises:

hydraulic cylinders coupled to the lift arm for raising and lowering the lift arm along the path.

6. The control apparatus of claim 5 wherein the hydraulic power circuit provides fluid under pressure to the hydraulic cylinders to vary the length of the hydraulic cylinders to raise and lower the lift arm based on the command input.

7. The control apparatus of claim 6 wherein the power interruption means interrupts flow of the fluid under pressure between the hydraulic power circuit and the hydraulic cylinders based on the sensed parameter.

8. The control apparatus of claim 7 wherein the manually operable bypass means allows fluid under pressure to flow between the hydraulic cylinders and the hydraulic power circuit, bypassing the interruption valve means.

9. The control apparatus of claim 8 wherein the input means includes:

lift arm control valve means, responsive to the command input, for controlling the fluid under pressure flowing to and from the hydraulic cylinders to raise and lower the lift arm based on the command input.

10. The control apparatus of claim 9 wherein the second hydraulic valve comprises a one-way valve allowing the fluid under pressure to flow from the hydraulic cylinders to the lift arm control valve so that, when the interruption valve means interrupts the flow of the fluid under pressure between the hydraulic cylinders and the lift arm control valve means, the lift arm is lowerable when the one-way valve is actuated and when the lift arm control valve controls flow of the fluid under pressure to lower the lift arm, and wherein the manually operable bypass means further comprises:

an orifice, coupled to the second hydraulic valve, to constrict flow of the fluid under pressure to reduce a lowering velocity at which the lift arm is lowered when the interruption valve means interrupts fluid flow between the hydraulic cylinders and the lift arm control valve means.

11. The control apparatus of claim 1 wherein the sensed parameter comprises operator presence.

12. The control apparatus of claim 1 wherein the skid steer loader comprises a tool coupled to the lift arm and wherein the control apparatus further comprises:

second power actuator means, coupled to the lift arm and the tool, for manipulating the tool; and second power interruption means, coupled to the power actuator and the sensor, for interrupting power to the second power actuator means based on the sensor signal.

13. In a skid steer loader having hydraulic cylinders for raising and lowering a lift arm structure, and a hydraulic circuit for providing fluid under pressure through a conduit to the hydraulic cylinders to vary the length of the hydraulic cylinders, a lockout apparatus comprising:

a sensor for sensing a desired parameter and providing a sensor signal indicative of the sensed parameter;

lockout valve means, coupled to the sensor and to the conduit between the hydraulic circuit and the hydraulic cylinders, for disrupting flow of hydraulic fluid in the conduit between the hydraulic cylinders and the hydraulic circuit, based on the sensor signal; and manual bypass valve means, coupled to the hydraulic circuit and the hydraulic cylinders, for opening a bypass conduit to provide hydraulic fluid communication around the lockout valve means between the hydraulic circuit and the hydraulic cylinders, when manually activated, to bypass the lockout valve means.

14. The lockout apparatus of claim 13 wherein the hydraulic circuit comprises:

control valve means, coupled to the lockout valve means and the manual bypass valve means, for receiving a command signal and for controlling flow of hydraulic fluid to raise and lower the lift arm structure based on the command signal.

15. The lockout apparatus of claim 14 wherein the manual bypass valve means comprises:

a valve assembly actuable to allow the hydraulic fluid to flow from the hydraulic cylinders to the control valve means through the bypass conduit so that, when the lockout valve means disrupts the flow of the hydraulic fluid between the hydraulic cylinders and the hydraulic circuit, the lift arm structure is lowerable when the valve assembly is actuated and when the control valve means controls flow of the hydraulic fluid to lower the lift arm structure.

16. The lockout apparatus of claim 15 wherein the valve assembly further comprises:

flow constriction means for constricting flow of the hydraulic fluid through the bypass conduit to reduce a lowering velocity at which the lift arm structure is lowered when the lockout valve means disrupts fluid flow between the hydraulic cylinders and the control valve means.

17. The lockout apparatus of claim 16 wherein the sensed parameter comprises operator presence.

18. The lockout apparatus of claim 13 wherein the lift arm structure includes a lift arm, a tool coupled to the lift arm, and a tool cylinder coupled to the lift arm, the tool, and the hydraulic circuit, for manipulating the tool and wherein the lockout apparatus further includes:

second lockout valve means, coupled to the sensor and the tool cylinder, for disrupting flow of hydraulic fluid between the tool cylinder and the hydraulic circuit, based on the sensor signal.

19. In a skid steer loader of the type having a lift arm structure, at least one cylinder coupled to the lift arm structure and pump means for providing fluid under pressure, an apparatus for controlling manipulation of the lift arm structure, the apparatus comprising:

a sensor, coupled to the skid steer loader, for sensing a parameter and providing a sensor signal indicative of the sensed parameter;

a lift arm control valve, coupled to the pump means, for receiving a lift arm control input and providing the fluid under pressure to the cylinder to vary the length of the cylinder for manipulating the lift arm structure based on the lift arm control input;

a lockout valve, coupled to the lift arm control valve and the cylinder and responsive to the sensor signal, for moving between a lockout position, blocking fluid flow through a first conduit between the cylinder and the lift arm control valve, and an open position, based on the sensor signal; and a bypass valve, coupled between the lift arm control valve and the cylinder, actuable to permit fluid flow between the cylinder and the lift arm control valve through a second conduit, around the lockout valve.

20. The apparatus of claim 19 wherein the lift arm structure comprises:

a lift arm coupled to the cylinder so that when the lift arm control valve is in a first position, controlling the cylinder to increase in length, the lift arm moves generally vertically upward, and when the lift arm control valve is in a second position, controlling the cylinder to decrease in length, the lift arm moves generally vertically downward; and wherein when the lift arm control valve is in the second position, and when the bypass valve is actuated, the lift arm moves generally vertically downwardly regardless of whether the lockout valve is in the lockout position.

21. The apparatus of claim 19 wherein the lift arm structure comprises:

a lift arm; and a tool, supported by the lift arm, wherein the cylinder is coupled to the tool for manipulating the tool.

22. The apparatus of claim 19 wherein the sensed parameter comprises:

operator presence.

* * * * *

UNITED STATES PATENT AND TRADEMARK OFFICE
CERTIFICATE OF CORRECTION

PATENT NO. : 5,577,876
DATED : November 26, 1996
INVENTOR(S) : Haeder et al.

It is certified that error appears in the above-indentified patent and that said Letters Patent is hereby corrected as shown below:

On the title page, item [54] and col. 1, line 1,

Please delete "INTERBLOCK" and insert --INTERLOCK--.

Signed and Sealed this

Fifteenth Day of July, 1997

Attest:

BRUCE LEHMAN

*Attesting Officer*  *Commissioner of Patents and Trademarks*